P. MEYER.
QUAKING GRASS DESTROYER.
APPLICATION FILED FEB. 2, 1910.
1,018,513.
Patented Feb. 27, 1912.
2 SHEETS—SHEET 1.
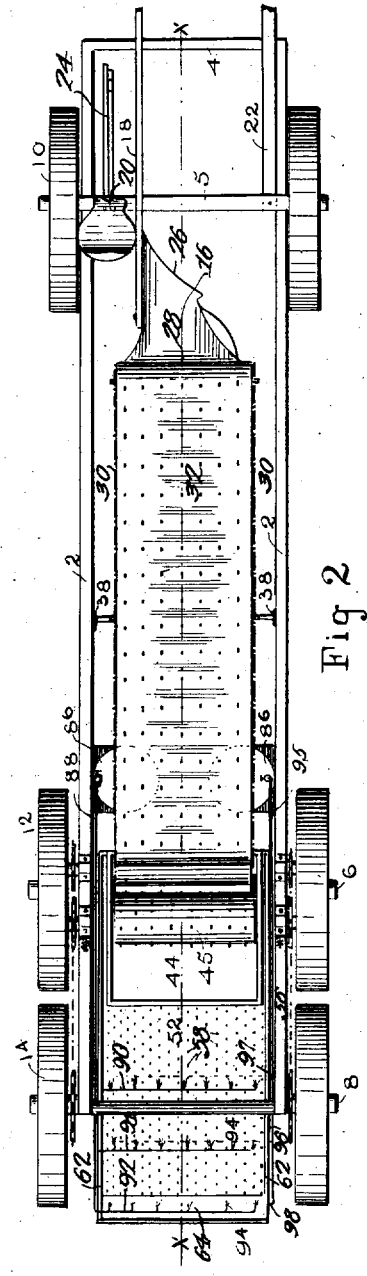
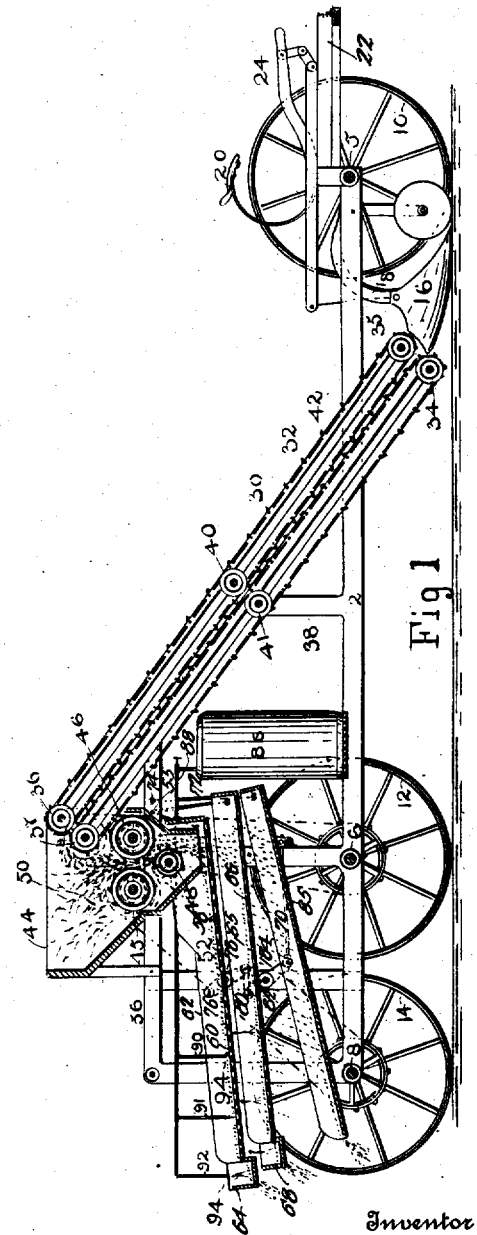
Witnesses
F. Thornely
E. M. Noonan.
Inventor
Peter Meyer
By
M. M. Cady
Attorney

P. MEYER.
QUAKING GRASS DESTROYER.
APPLICATION FILED FEB. 2, 1910.

1,018,513.

Patented Feb. 27, 1912.

2 SHEETS—SHEET 2.

Witnesses
F. Thornely
E. M. Noonan

Inventor
Peter Meyer

By M. M. Cady
Attorney

UNITED STATES PATENT OFFICE.

PETER MEYER, OF CALMAR, IOWA.

QUAKING-GRASS DESTROYER.

1,018,513.  Specification of Letters Patent.  Patented Feb. 27, 1912.

Application filed February 2, 1910. Serial No. 541,496.

*To all whom it may concern:*

Be it known that I, PETER MEYER, citizen of the United States, residing at Calmar, in the county of Winneshiek and State of Iowa, have invented certain new and useful Improvements in Quaking-Grass Destroyers, of which the following is a specification.

My invention has relation to means for destroying all kinds of vegetation and life of every kind on land with special reference to the destruction of quaking-grass that is so exceedingly destructive to the growth of any other grasses or seeded grains in the same field, and my object is to provide a simple means whereby a portion of the upper surface of the soil is cut or removed and then pulverized and afterward subjected to the action of heat till all life is destroyed.

In what it consists, the mode of construction and manner of operation will be fully set out in the following specification when taken in connection with the drawings accompanying the same and forming a part hereof.

Figure 3:
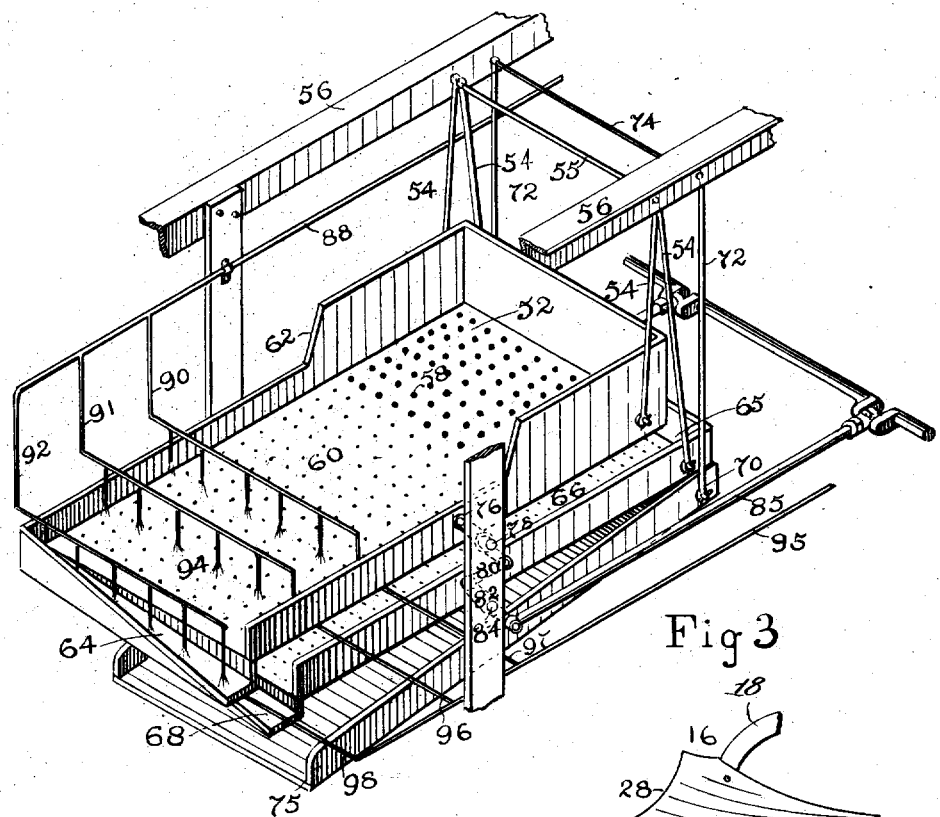
Figure 4:
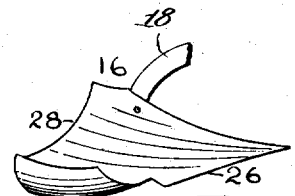
Figure 5:
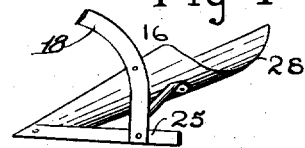

Figure 1 is a sectional elevation through line $x$—$x$ of Fig. 2. Fig. 2 is a plan view. Fig. 3 is a perspective view of the trays and the burners for applying heat to the vegetation as it passes over the trays. Figs. 4 and 5 are perspective views of the plow or scoop taken in different positions.

Referring to the drawings, 2 represents the side bars, which with the cross bar 4, constitute the lower frame of the machine, which is sustained on axles 5, 6 and 8 and carried by the wheels 10, 12, and 14, constituting the carriage on which the operating mechanism hereinafter to be described is situated. To the front axle 5 is mounted a plow or scoop 16 by the beam 18. On the axle is set the driver's seat 20 and there is also secured to said axle a tongue 22 to which the team or power to operate the same is attached. There is further pivoted on the axle a lever 24 which is attached to the plow 16, and by which the plow is raised and lowered. The plow is constructed with the land side 25 and the shear 26 which is formed into a concave mold-board 28 at its rear end. To the end 28 is connected an elevator 30. The elevator is made of endless belts 32, preferably of rubber canvas or other flexible material, which belts pass over rollers 34 and 35 at the base, and at the top rollers 37 and 36.

In order to maintain the incline and prevent it from sagging and clogging, there are set up on the frame 2, uprights 38 to which are secured rollers 40 and 41. The canvas is supplied with teeth 42 adapted to engage and carry up any material that is deposited upon the elevator by the plow. At the top of the elevator there is a hopper 44 in which all of the material carried up by the elevator is dumped. At the base of the hopper are mounted two crushing rollers 45 and 46, and beneath them a smaller crushing roller 48. All of these rollers mesh into each other, and being provided with teeth 50 they are adapted to thoroughly crush and pulverize all of the earth that is delivered into the hopper.

At the base of the hopper is loosely suspended a tray 52 by the hangers 54, pivoted to a cross bar 55. The cross bar 55 is secured in the main frame 56 of the machine which rests upon and is attached to the side bars 2. The tray 52 is provided with perforations 58 and 60. The perforations 58 are considerably larger than the perforations 60 for the purposes presently to appear. This tray is surrounded on three sides by a frame 62, and at the lower end with a trough or chute 64. This tray 52 is given a jigging or oscillating motion. Beneath the tray 52 is also suspended another tray 65 constructed in substantially the same manner as the tray 52, but preferably with uniform perforations 66. This tray is also provided with a chute 68 and is suspended from the cross bar 55 by the hangers 54. It is also given the same jigging motion as the tray 52. Beneath the tray 65 is suspended a trailing conveyer 70 by the hangers 72 secured to the cross bar 74, also secured in the main frame 56. The conveyer is provided with the side pieces 75 and has the same jigging motion as the other trays but no perforations through the base. The depending portions of the frame 56 at each side of the trays are provided with rods 78 and 84 on which are pivotally mounted the levers 76 and 82, respectively, connected by link 80. The upper ends of the levers are connected to and are adapted to oscillate the trays 52 and 65 and the lower end of lever 82 is connected to and adapted to oscillate the conveyer 70, the rod 85 connecting the lever 82 to the operating means.

On the frame 2 are set two oil or gasolene tanks 86, one on each side to which are connected pipes 88. There is connected to the pipe 88 the burner pipes 90, 91 and 92 provided with the jets 94 by which the grass, the seeds and other life are destroyed while passing over the tray 52. There is also a similar pipe 95 which conveys the gasolene to the pipes 96, 97 and 98 that supply the gasolene to the burners upon the lower tray 65.

The mode of operating my device whereby I accomplish the end sought is substantially as follows. Power is applied to the tongue 22. This may be by an ordinary team or by a traction engine, and as the car is started the plow will commence to shave off preferably about four inches of the upper part of the land and carry it back and deliver it upon the elevator 30 between the rollers 34 and 35 and the canvas 32, and by this elevator it is carried up between the rollers 36 and 37 and dumped into the hopper 44. From the hopper it passes down between the crushing rollers 45 and 46 and between the lower roller 48 where it is thoroughly pulverized. From there it passes down into the upper tray 52 and as this tray has a jigging or oscillating motion by power that is applied to the shaft 85, through the shaft 78 and the links 76, the coarser portion of the mass will pass through the perforations 58, and the finer through the perforations 60, thus separating the seeds and earthy portion of the mass from the fibrous and leaving the fibrous portion upon the tray 52 and some of the larger portions that cannot pass through the perforations 58. The mass that does not pass through the perforations is carried down under the burners 94 and there all of the fibrous part of the mass is reduced to ashes, and the seeds in the grass that have not fallen through the perforations are also subjected to sufficient heat to destroy the life. This burned portion then passes on and into the chute 64 and since this chute is set at an angle it will deliver the burned mass over on to the end of the conveyer 70. The earthy portion of the mass that has been screened through the perforations of different sizes in the tray 52 passes down into the lower tray 65, which tray is perforated and has the same motion as the tray 52. The mass there is also subjected to the action of the heat of the burners upon the tubes 98, and then part passes through the perforations of said tray 65 onto the conveyer 70 and the coarser portion is delivered over the chute 68 onto the end of the conveyer 70. The portion such as the finer seeds that have been sifted through the perforations in the tray 65, drops onto the tray 70 and then it passes over the end of the conveyer onto the ground from whence it was taken. It will be seen by this mode of construction and operation that about four to eight inches in depth, which would be sufficiently deep to destroy most of the roots and seeds, will be subjected to intense heat and life will be entirely destroyed and the land put in condition for seeding.

Having now described my invention what I claim and desire to secure by Letters Patent, is:—

1. In a device of the class described, a tray provided with perforations of various size through the bottom of the tray for separating the fibrous and larger particles of material from the mass, in combination with means for delivering the material to the tray, means for imparting motion to the tray, and means for burning upon the tray the fibrous portion from which the other portion of the mass has been separated.

2. In a device of the class described, a tray set at an angle and provided with perforations in the bottom of the tray of larger size at the upper end of the tray and smaller size toward the lower end, in combination with means for delivering the material to the tray, means for imparting an oscillating motion to the tray, burners adapted to attack and burn the fibrous portion of the material upon the tray from which the other portions of the mass have been separated, and means for supplying fuel to the burners.

3. In a device of the class described, a tray loosely suspended on an incline, in combination with means for delivering the material to the tray, means for imparting a shaking motion to the tray, means connected with the tray adapted to separate the fibrous material from the remaining portions of the mass on the tray, and burners adapted to burn the fibrous material from which the balance of the mass has been separated on the tray while the tray is in motion.

4. In a device of the class described, an upper tray provided with openings of varying size through the bottom of the tray, in combination with means for delivering the material to the tray, a second tray beneath the first provided with openings, means for imparting motion to both of the trays, means for burning the fibrous material on the surface of the upper tray after the remaining portion of the mass has been separated therefrom, and means for subjecting the upper surface of the material on the lower tray to the action of heat.

5. In a device of the class described, an upper tray provided with perforations of different size, in combination with means for delivering the material to the tray, a second tray set beneath the first, means for destroying by flame the fibrous portion of the material upon the upper tray, and means for destroying the life in the remainder of the mass on the lower tray by the action of heat.

6. In a device of the class described, an upper tray provided with openings, in combination with means for delivering the material to be separated to the tray, a second tray set beneath the upper tray, means for imparting motion to both of the trays, means for consuming the fibrous parts of the mass upon the upper tray, and means for subjecting the remainder of the mass separated from the fibrous portion of the mass to the action of heat on the lower tray.

7. In a device of the class described, a tray provided with openings varying in size, in combination with means for delivering the material to the tray, a second tray set beneath the first, means for imparting motion to both trays, burners adapted to attack and burn the fibrous portion of the mass on the first tray, and burners adapted to attack and destroy the life on the lower tray in the unburned portion of the mass received from the upper tray and thereby also heat the base of the upper tray.

8. In a device of the class described, an upper tray provided with perforations and set at an angle, in combination with means for delivering the material to the tray, a second perforated tray suspended beneath the upper tray, means for burning the fibrous material on the upper tray, means for subjecting to the action of heat the upper surface of the material upon the second tray received from the upper tray, a conveyer beneath the second tray adapted to receive the burned material from the second tray, and means for imparting motion to both trays and conveyer.

9. In a device of the class described, an upper tray provided with perforations of different size, in combination with means for delivering the material to the tray, means for burning the fibrous part of the material on the upper tray, a second tray suspended beneath the upper tray and provided with perforations, means for subjecting to the action of heat the upper surface of the material upon the second tray, a conveyer suspended beneath the second tray, connections between the second tray and the conveyer, and means for imparting motion to the trays and conveyer for distributing the burned material from the conveyer onto the ground from whence it was taken.

10. In a device of the class described, an upper tray set at an incline and provided with perforations larger at the upper end and smaller at the lower end, in combination with means for delivering the material to the tray, a second tray beneath the first provided with openings, means for burning the fibrous material on the upper tray after the remainder of the mass has been separated from the fibrous material, burners for burning on the lower tray the unburned mass received from the upper tray, a conveyer beneath the lower tray adapted to receive the burned mass from the lower tray and deliver it to the ground, means for supplying fuel to the burners on both of the trays, and means for imparting motion to both the trays and conveyer.

In testimony whereof I affix my signature in presence of two witnesses.

PETER MEYER.

Witnesses:
M. M. CADY,
E. M. NOONAN.

---

Copies of this patent may be obtained for five cents each, by addressing the "Commissioner of Patents, Washington, D. C."